United States Patent
Kikuta et al.

(10) Patent No.: US 11,878,698 B2
(45) Date of Patent: Jan. 23, 2024

(54) DISPLAY CONTROL DEVICE, DISPLAY CONTROL METHOD, AND STORAGE MEDIUM STORING DISPLAY CONTROL PROGRAM

(71) Applicant: Mitsubishi Electric Corporation, Tokyo (JP)

(72) Inventors: Hayato Kikuta, Tokyo (JP); Yoshitomo Nakamura, Tokyo (JP); Satoru Kubota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 318 days.

(21) Appl. No.: 17/600,607

(22) PCT Filed: Apr. 12, 2019

(86) PCT No.: PCT/JP2019/015944
§ 371 (c)(1),
(2) Date: Oct. 1, 2021

(87) PCT Pub. No.: WO2020/208804
PCT Pub. Date: Oct. 15, 2020

(65) Prior Publication Data
US 2022/0169257 A1 Jun. 2, 2022

(51) Int. Cl.
*B60W 40/08* (2012.01)
*B60W 50/14* (2020.01)
(Continued)

(52) U.S. Cl.
CPC ............. *B60W 40/08* (2013.01); *B60K 35/00* (2013.01); *B60W 40/04* (2013.01);
(Continued)

(58) Field of Classification Search
CPC ................ B60W 40/08; B60W 40/04; B60W 2540/221; B60W 2540/225;
(Continued)

(56) References Cited

U.S. PATENT DOCUMENTS 6,327,522 B1 * 12/2001 Kojima ................ B60K 35/00
701/1
7,158,097 B2 * 1/2007 Taylor .................... G06F 3/013
345/156

(Continued)

FOREIGN PATENT DOCUMENTS

CN        105009032 A     10/2015
JP        2002-104018 A    4/2002
(Continued)

OTHER PUBLICATIONS

International Search Report and Written Opinion dated Jun. 11, 2019, received for PCT Application PCT/JP2019/015944, Filed on Apr. 12, 2019, 9 pages including English Translation.
(Continued)

*Primary Examiner* — Jaime Figueroa
(74) *Attorney, Agent, or Firm* — XSENSUS LLP (57) ABSTRACT

A display control device includes processing circuitry to acquire traveling environment information; to estimate driving skill of the driver; to detect a direction of a line of sight of the driver; to accumulate information on movements of the sight line direction and driving action information; to calculate a visual field range and a visual recognition level indicating ease of recognition of each of a plurality of sections in the visual field range by the driver's vision based on the information on the movements of the sight line direction and the driving action information accumulated in the memory and at least one of the traveling environment information and the driving skill information; and to receive display information and to control at least one of a display
(Continued)

position and a display method of an image on a basis of the display information.

11 Claims, 5 Drawing Sheets

(51) Int. Cl.
 *B60K 35/00* (2006.01)
 *B60W 40/04* (2006.01)

(52) U.S. Cl.
 CPC .. *B60K 2370/176* (2019.05); *B60K 2370/178* (2019.05); *B60K 2370/179* (2019.05); *B60K 2370/186* (2019.05); *B60W 2540/221* (2020.02); *B60W 2540/225* (2020.02); *B60W 2556/10* (2020.02); *B60W 2556/45* (2020.02)

(58) Field of Classification Search
 CPC ......... B60W 2556/10; B60W 2556/45; B60W 50/14; B60W 2050/146; B60K 35/00; B60K 2370/176; B60K 2370/178; B60K 2370/179; B60K 2370/186; B60K 2370/149; B60K 2370/1529; B60K 2370/161; B60K 2370/177; B60K 2370/184; G08G 1/16
 USPC ............................................................. 701/1
 See application file for complete search history.

(56) References Cited

U.S. PATENT DOCUMENTS

| | | | | |
|---|---|---|---|---|
| 7,952,808 | B2 * | 5/2011 | Hotta | G02B 27/01 340/425.5 |
| 7,966,128 | B2 * | 6/2011 | Widodo | G01C 21/3644 356/29 |
| 8,185,380 | B2 * | 5/2012 | Kameyama | G08G 1/0962 434/362 |
| 8,792,177 | B2 * | 7/2014 | Nakamura | G02B 27/0101 359/630 |
| 9,576,489 | B2 * | 2/2017 | Park | B60W 40/04 |
| 9,711,050 | B2 * | 7/2017 | Ansari | G06Q 30/0251 |
| 9,770,948 | B2 * | 9/2017 | Kobayashi | B60C 9/00 |
| 9,878,723 | B2 * | 1/2018 | Kim | B60W 60/0054 |
| 10,331,127 | B2 * | 6/2019 | Oba | B60W 50/14 |
| 10,419,655 | B2 * | 9/2019 | Sivan | G06F 3/012 |
| 10,493,997 | B2 * | 12/2019 | Kim | B60W 60/0059 |
| 10,496,252 | B2 * | 12/2019 | Ren | G01C 21/367 |
| 11,535,155 | B2 * | 12/2022 | Watanabe | G09B 29/007 |
| 11,646,000 | B2 * | 5/2023 | Tsuji | G02B 27/0101 345/419 |
| 11,654,936 | B2 * | 5/2023 | Yamamoto | B60W 60/0059 701/27 |
| 2002/0003571 | A1 * | 1/2002 | Schofield | B60Q 1/543 348/148 |
| 2005/0060069 | A1 * | 3/2005 | Breed | G08G 1/166 701/408 |
| 2008/0077321 | A1 * | 3/2008 | Widodo | G01C 21/3644 701/29.5 |
| 2009/0292528 | A1 * | 11/2009 | Kameyama | G10L 13/00 704/E21.001 |
| 2010/0026722 | A1 * | 2/2010 | Kondo | H04N 17/00 345/660 |
| 2010/0073773 | A1 * | 3/2010 | Hotta | G02B 27/01 359/630 |
| 2012/0139816 | A1 * | 6/2012 | King | B60Q 9/00 340/425.5 |
| 2012/0271484 | A1 * | 10/2012 | Feit | G01S 13/931 701/1 |
| 2013/0024113 | A1 * | 1/2013 | Weng | G01C 21/3638 701/450 |
| 2013/0188259 | A1 * | 7/2013 | Nakamura | G02B 27/0101 359/630 |
| 2015/0206431 | A1 * | 7/2015 | Park | B60W 40/04 701/1 |
| 2016/0004321 | A1 | 1/2016 | Takada et al. | |
| 2016/0090035 | A1 * | 3/2016 | Kobayashi | B60Q 9/00 340/456 |
| 2016/0185219 | A1 | 6/2016 | Sakata et al. | |
| 2016/0358477 | A1 * | 12/2016 | Ansari | G06Q 40/08 |
| 2017/0028995 | A1 * | 2/2017 | Mori | B60W 60/0053 |
| 2017/0096145 | A1 * | 4/2017 | Bahn | B60Q 9/00 |
| 2017/0185867 | A1 * | 6/2017 | Lee | G06T 11/001 |
| 2017/0192637 | A1 * | 7/2017 | Ren | G06F 3/04817 |
| 2017/0247041 | A1 * | 8/2017 | Kim | G05D 1/0061 |
| 2017/0287335 | A1 * | 10/2017 | Ansari | H04L 67/12 |
| 2017/0307883 | A1 | 10/2017 | Yamasaki | |
| 2017/0364070 | A1 * | 12/2017 | Oba | B60W 60/0053 |
| 2018/0144552 | A1 * | 5/2018 | Ishikawa | G06F 3/0481 |
| 2018/0284774 | A1 * | 10/2018 | Kawamoto | G01C 21/26 |
| 2019/0094959 | A1 * | 3/2019 | Tan | B60K 35/00 |
| 2019/0182415 | A1 * | 6/2019 | Sivan | G06F 3/013 |
| 2020/0198649 | A1 * | 6/2020 | Emura | G05B 13/0265 |

FOREIGN PATENT DOCUMENTS

| | | |
|---|---|---|
| JP | 2009-274542 A | 11/2009 |
| JP | 2010-18201 A | 1/2010 |
| JP | 2010-79844 A | 4/2010 |
| JP | 2010-257253 A | 11/2010 |
| JP | 2012-194060 A | 10/2012 |
| WO | 2015/025350 A1 | 2/2015 |
| WO | 2016/042838 A1 | 3/2016 |

OTHER PUBLICATIONS

Office Action dated Sep. 15, 2023, in Chinese Patent Application No. 201980094695.5, 21 pages.

* cited by examiner

DISPLAY CONTROL DEVICE, DISPLAY CONTROL METHOD, AND STORAGE MEDIUM STORING DISPLAY CONTROL PROGRAM

CROSS-REFERENCE TO RELATED APPLICATION

The present application is based on PCT filing PCT/JP2019/015944, filed Apr. 12, 2019, the entire contents of which are incorporated herein by reference.

TECHNICAL FIELD

The present invention relates to a display control device, a display control method and a display control program.

BACKGROUND ART

There has been proposed a device that measures a visual field range as a range visible to a driver of a vehicle based on the direction of the driver's line of sight after movement when the movement of the line of sight of the driver situated on the driver's seat of the vehicle is detected and projects an image onto the inside of the visual field range on the front windshield (windshield) (see Patent Reference 1, for example).

PRIOR ART REFERENCE

Patent Reference

Patent Reference 1: Japanese Patent Application Publication No. 2010-18201

SUMMARY OF THE INVENTION

Problem to be Solved by the Invention

However, the visual field range of the driver changes depending on factors other than the direction of the driver's line of sight. For example, the visual field range of the driver has a tendency to narrow when the driver's driving skill (driving proficiency) is low or environment around the traveling vehicle (e.g., congestion level) is at high density. Therefore, if the visual field range is determined based exclusively on the direction of the line of sight, there is a possibility that the driver overlooks the image displayed in the visual field range.

An object of the present invention, which has been made to resolve the above-described problem with the conventional technology, is to provide a display control device, a display control method and a display control program capable of controlling a display device so that an image is displayed at a position appropriate for the driver.

Means for Solving the Problem

A display control device according to an aspect of the present invention includes processing circuitry to acquire traveling environment information indicating environment around a vehicle driven by a driver; to estimate driving skill of the driver and to generate driving skill information indicating the driving skill; to detect a direction of a line of sight of the driver and to generate sight line direction information indicating the direction of the line of sight; to accumulate information on movements of the sight line direction occurring at times of driving actions of the driver and driving action information on the driver in a memory, the information on the movements being obtained by the sight line direction information; to calculate a visual field range indicating a region that can be visually recognized by the driver and a visual recognition level indicating ease of recognition of each of a plurality of sections in the visual field range by the driver's vision based on the information on the movements of the sight line direction and the driving action information accumulated in the memory and at least one of the traveling environment information and the driving skill information; and to receive display information to be presented to the driver and to control at least one of a display position and a display method of an image on a basis of the display information based on the display information, the visual field range and the visual recognition level.

A display control method according to another aspect of the present invention includes acquiring traveling environment information indicating environment around a vehicle driven by a driver; estimating driving skill of the driver and generating driving skill information indicating the driving skill; detecting a direction of a line of sight of the driver and generating sight line direction information indicating the direction of the line of sight; accumulating information on movements of the sight line direction occurring at times of driving actions of the driver and driving action information on the driver, the information on the movements being obtained by the sight line direction information; calculating a visual field range indicating a region that can be visually recognized by the driver and a visual recognition level indicating ease of recognition of each of a plurality of sections in the visual field range by the driver's vision based on the accumulated information on the movements of the sight line direction and the accumulated driving action information and at least one of the traveling environment information and the driving skill information; and receiving display information to be presented to the driver and controlling at least one of a display position and a display method of an image on a basis of the display information based on the display information, the visual field range and the visual recognition level.

Effect of the Invention

According to the present invention, the display control can be executed so that the image is displayed at a position appropriate for the driver.

MODE FOR CARRYING OUT THE INVENTION

A display control device, a display control method and a display control program according to each embodiment of the present invention will be described below with reference to the drawings. The following embodiments are just examples and a variety of modifications are possible within the scope of the present invention.

(1) First Embodiment (1-1) Driving Support Device 1

Figure 1:
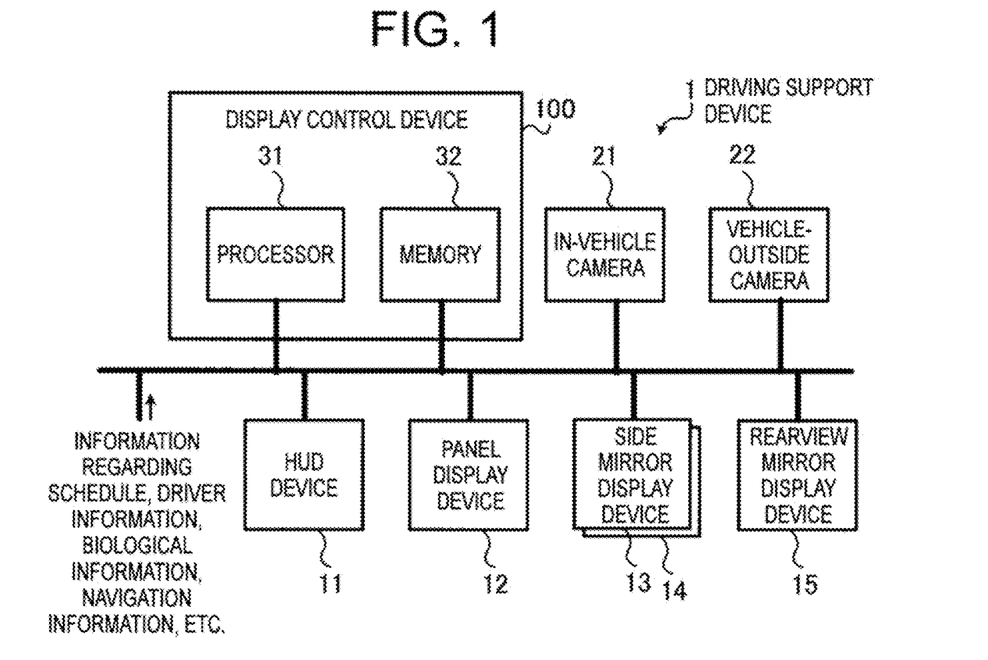
FIG. 1 is a diagram showing an example of the hardware configuration of a driving support device including a display control device according to a first embodiment of the present invention.

FIG. 1 is a diagram showing an example of the hardware configuration of a driving support device 1 including a display control device 100 according to a first embodiment of the present invention. As shown in FIG. 1, the driving support device 1 is installed in an automobile as a vehicle driven by a driver. The driving support device 1 includes a head-up display (HUD) device 11, an instrument panel display device 12, electronic side mirror display devices 13 and 14, an electronic rearview mirror display device 15, an in-vehicle camera 21, a vehicle-outside camera 22 and the display control device 100. The driving support device 1 may include a microphone (not shown) for detecting conversational voice in the vehicle. The display control device 100 includes a processor 31 and a memory 32. The HUD device 11 displays various items of information in superimposition with a scene viewed through a front windshield 10, for example. The HUD device 11 displays a semitransparent image, for example. The instrument panel display device 12 is an instrument panel including a speedometer and the like, which is referred to also as a panel display device 12. The electronic side mirror display devices 13 and 14 are display devices for displaying images of scenes to the left and right rear of the vehicle captured by the vehicle-outside camera 22, for example, which are referred to also as side mirror display devices 13 and 14. The electronic rearview mirror display device 15 is a display device for displaying an image of a scene to the rear of the vehicle captured by the vehicle-outside camera 22, for example, which is referred to also as a rearview mirror display device 15. The driving support device 1 may include a sensor such as an infrared ray sensor for detecting or measuring environment outside the vehicle instead of or in addition to the vehicle-outside camera 22.

The HUD device 11 is a display device that displays an image in superimposition with the scene outside the vehicle viewed through the front windshield of the vehicle. The panel display device 12 is a display device in the instrument panel arranged under the front windshield. The side mirror display device 13 is a display device that displays an image of a scene outside the vehicle at a position on a left-hand side of the panel display device 12. The side mirror display device 14 is a display device that displays an image of a scene outside the vehicle at a position on a right-hand side of the panel display device 12. The rearview mirror display device 15 is a display device that displays the environment to the rear of the vehicle. While five display devices are shown in FIG. 1, the number of display devices is not limited to five.

The in-vehicle camera 21 is an image capturing device that captures images of the driver seated on the driver's seat of the vehicle. The vehicle-outside camera 22 is an image capturing device that captures images of the scene outside the vehicle, that is, around the vehicle. While one in-vehicle camera 21 is shown in FIG. 1, there can be two or more in-vehicle cameras. It is unnecessary to provide the in-vehicle camera 21 when another means for detecting the driver's line of sight is provided. Further, while one vehicle-outside camera 22 is shown in FIG. 1, there can be two or more vehicle-outside cameras.

The display control device 100 controls the operation of the HUD device 11, the panel display device 12, the side mirror display devices 13 and 14, the rearview mirror display device 15, the in-vehicle camera 21 and the vehicle-outside camera 22. Further, the display control device 100 acquires information regarding movement of the vehicle, information regarding driving operations by the driver, and so forth from a movement control device (not shown) that controls the movement of the vehicle. The information regarding the movement of the vehicle includes traveling speed, travel distance, fuel remaining, and so forth. The information regarding the driving operations includes condition of a brake operation by the driver, condition of a steering operation by the driver, and so forth.

The display control device 100 includes the processor 31 as an information processing unit and the memory 32 as a storage unit for storing information. The display control device 100 is a computer, for example. A display control program for executing a display control method has been installed in the memory 32. The display control program is installed via a network or from a storage medium storing information, for example. The processor 31 controls the operation of the whole of the driving support device 1 by executing the display control program stored in the memory 32. The whole or part of the display control device 100 may be formed with a control circuit made up of semiconductor integrated circuits. The memory 32 may include various types of storage devices such as a semiconductor storage device, a hard disk drive and a device that records information in a removable record medium.

Figure 2:
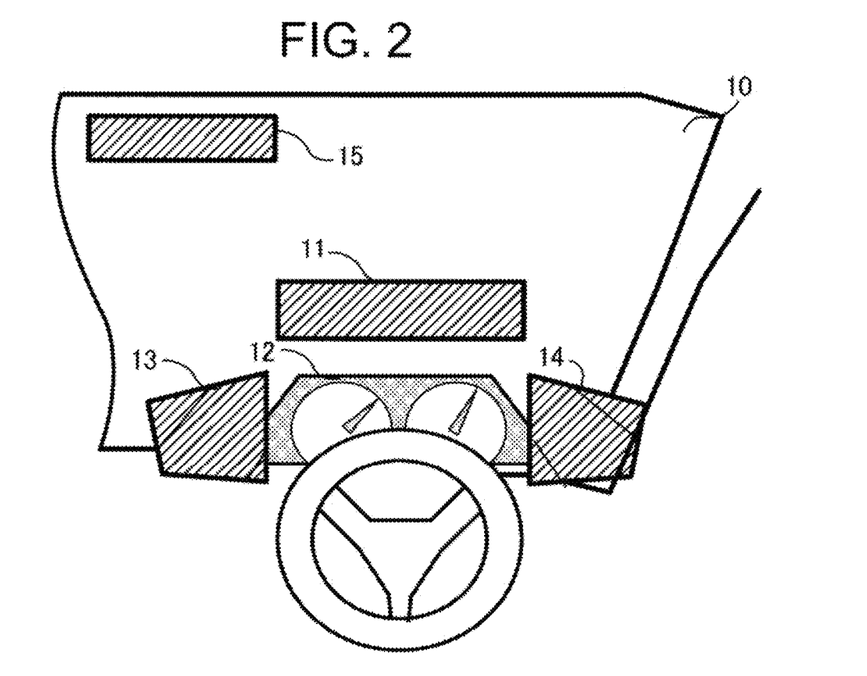
FIG. 2 is a diagram showing an example of images displayed based on control executed by the display control device according to the first embodiment.

FIG. 2 is a diagram showing an example of images displayed based on control executed by the display control device 100 according to the first embodiment. FIG. 2 indicates the positions of the images displayed in front directions as viewed from the driver situated on the driver's seat of the vehicle. The HUD device 11 displays an image in superimposition with the scene outside the vehicle viewed through the front windshield 10 of the vehicle. The panel display device 12 is arranged under the front windshield 10. The side mirror display devices 13 and 14 are respectively arranged to the left and right of the panel display device 12. The rearview mirror display device 15 is arranged on an upper part of the front windshield 10. However, the arrangement and shapes of these display devices are not limited to the example of FIG. 2.

(1-2) Display Control Device 100

Figure 3:
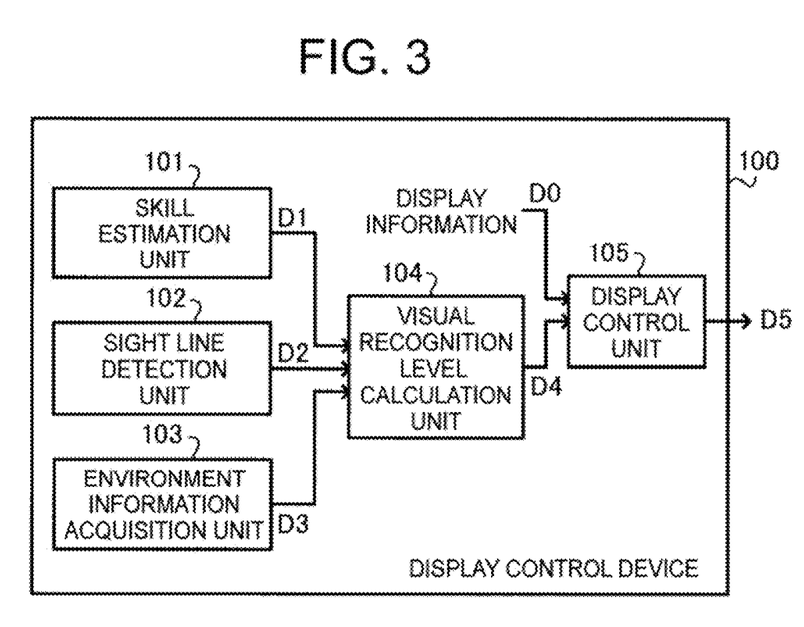
FIG. 3 is a functional block diagram schematically showing the configuration of the display control device according to the first embodiment.

FIG. 3 is a functional block diagram schematically showing the configuration of the display control device 100 according to the first embodiment. The display control device 100 controls display content, display positions and display methods of the images presented to the driver by the various types of display devices shown in FIG. 2. As shown in FIG. 3, the display control device 100 includes a skill estimation unit 101, a sight line detection unit 102, an environment information acquisition unit 103, a visual recognition level calculation unit 104 and a display control unit 105.

The environment information acquisition unit 103 acquires traveling environment information D3 indicating the environment around the vehicle driven by the driver. The skill estimation unit 101 estimates driving skill of the driver driving the vehicle and generates driving skill information D1 indicating the driving skill. The sight line detection unit 102 detects the direction of the line of sight of the driver driving the vehicle and generates sight line direction information D2 indicating the direction of the line of sight.

The visual recognition level calculation unit 104 calculates a visual field range indicating a region that can be visually recognized by the driver at the present time point and a visual recognition level D4 in each of a plurality of sections (i.e., a plurality of subregions) in the visual field range based on the sight line direction information D2 and at least one of the traveling environment information D3 and the driving skill information D1. The visual recognition level D4 is a value indicating to what extent the driver easily visually recognizes each of the plurality of sections in the visual field range, that is, ease of visual recognition of each of the plurality of sections. The visual field range, the plurality of sections and the visual recognition level D4 will be described later by using FIG. 5. Incidentally, the following description will be given of an example in which the visual recognition level calculation unit 104 calculates the visual field range and the visual recognition level D4 in each of the plurality of sections in the visual field range based on the sight line direction information D2, the traveling environment information D3 and the driving skill information D1.

The display control unit 105 receives display information D0 to be presented to the driver and controls at least one of the display position and the display method of an image on the basis of the display information based on the display information D0 and the information D4 indicating the visual recognition levels in the visual field range. The display control unit 105 executes display control for presenting each driver with the image including the display information D0 at a position suitable for each driver. The display information D0 includes information provided from the movement control device (not shown) that controls the movement of the vehicle, information provided from a navigation device installed in the vehicle, information received by a communication device installed in the vehicle, and so forth.

Figure 4:
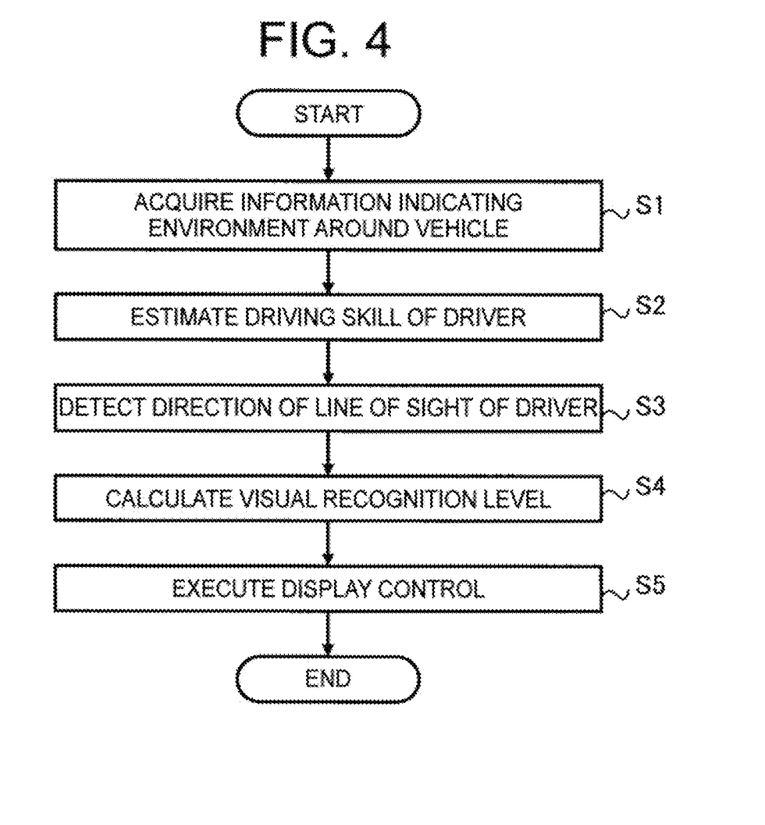
FIG. 4 is a flowchart showing the operation of the display control device according to the first embodiment.

FIG. 4 is a flowchart showing the operation of the display control device 100 according to the first embodiment. First, in step S1, the display control device 100 acquires the traveling environment information D3 indicating the environment around the vehicle driven by the driver. In step S2, the display control device 100 estimates the driving skill of the driver driving the vehicle and generates the driving skill information D1 indicating the driving skill. In step S3, the display control device 100 detects the direction of the line of sight of the driver driving the vehicle and generates the sight line direction information D2 indicating the direction of the line of sight. The order of the processes of the steps S1 to S3 is not limited to this order. The processes of the steps S1 to S3 may also be executed in parallel with each other.

In step S4, the display control device 100 calculates the visual field range indicating the region that can be visually recognized by the driver at the present time point and the visual recognition level D4 in each of the plurality of sections in the visual field range based on the sight line direction information D2 and at least one of the traveling environment information D3 and the driving skill information D1.

In step S5, the display control device 100 receives the display information D0 to be presented to the driver and controls at least one of the display position and the display method of the display information D0 based on the display information D0 and the visual recognition level D4 in each of the plurality of sections in the visual field range. The display control device 100 executes the display control for presenting the image including the display information D0 at the position suitable for each driver.

(1-3) Skill Estimation Unit 101

The skill estimation unit 101 estimates the driving skill of the driver based on driving actions of the driver and generates the driving skill information D1 indicating the driving skill. In other words, the skill estimation unit 101 estimates the driving skill, namely, driving proficiency, of the driver based on driving operations performed by the driver and generates the driving skill information D1 indicating the driving skill. The driving skill is referred to also as a driving empirical value since the driving skill varies depending on the amount of driving experience. The driving operation used for the estimation of the driving skill is, for example, a hard braking operation, a steering operation, a gear shifting operation, or a combination of two or more of these operations. However, the driving operation used for the estimation of the driving skill is not limited to the above-described operations or combinations.

The skill estimation unit 101 judges that the hard braking operation has been performed by the driver when the degree of depressing the brake pedal is higher than or equal to a depression threshold value determined depending on the driving speed. The skill estimation unit 101 can estimate that the driving skill of the driver is low when the ratio of the number of times of the hard braking operation to the number of times of the braking operation in the driving is higher than a predetermined reference ratio and estimate that the driving skill of the driver is high when the ratio of the number of times of the hard braking operation is less than or equal to the reference ratio. However, the driving skill estimation method based on the braking operation is not limited to this method. While the driving skill is classified into two groups based on the braking operation in the above-described example, it is also possible to classify the driving skill into three or more groups based on the braking operation.

The skill estimation unit 101 can also estimate that the driving skill of the driver is high when a revolution speed of the steering wheel in the steering operation is higher than a predetermined reference speed and estimate that the driving skill of the driver is low when the revolution speed of the steering wheel is less than or equal to the predetermined reference speed. However, the driving skill estimation method based on the steering operation is not limited to this method. While the driving skill is classified into two groups based on the steering operation in the above-described example, it is also possible to classify the driving skill into three or more groups based on the steering operation.

The skill estimation unit 101 can also accumulate history records of the gear shifting operation in regard to each of predetermined speed ranges of the vehicle's traveling speed and estimate the driving skill of the driver by referring to the accumulated operation history records. For example, the skill estimation unit 101 can estimate that the driving skill of the driver is high when the ratio of the number of times of performing gear shifting suitable for each speed range to the total number of times of gear shifting is higher than a predetermined reference ratio and estimate that the driving skill of the driver is low when the ratio is less than or equal to the reference ratio.

The skill estimation unit 101 can also previously store past driver information, such as the sum total of driving travel distances of the driver, information on past traffic accidents that occurred to vehicles driven by the driver and records of past traffic violations of the driver, in a storage unit and estimate the driving skill by referring to these items of information. The storage unit is the memory 32 shown in FIG. 1, for example. The previous inputting of the driver information to the storage unit of the skill estimation unit 101 can be carried out as inputting by manual operations by the user, inputting by a card reading device by reading in data recorded in an IC card or the like, performing individual identification of the driver based on information outputted from the in-vehicle camera 21 that captures images of the inside of the vehicle and acquiring data existing on a network or in-vehicle data based on the individual identification information on the driver, and so forth. The storage unit can also be a storage device outside the display control device 100 or an external storage device communicatively connected to the display control device 100 via a network.

Further, the driving skill information D1 changes depending on the condition of the driver. For example, the skill estimation unit 101 can estimate present health condition of the driver from biological information such as the heart rate, complexion or sight line movement of the driver and correct the estimated driving skill to the driver's original driving skill based on the present health condition. The skill estimation unit 101 can also detect the driver's actions other than the driving actions, such as conversation between the driver and a passenger and inattentive driving by the driver looking aside, and correct the driving skill based on the driver's actions other than the driving actions.

The skill estimation unit 101 can also make a correction under a particular condition by storing previously collected information on the driver's health condition such as chronic diseases or eyesight of the driver as the driving skill information D1 by reading in from an IC card, manual inputting or the like.

The skill estimation unit 101 may estimate the driving skill by using a combination of two or more of the various driving skill estimation methods described above. For example, the skill estimation unit 101 may determine the driving skill information based on one or more items of information among the driver's driving experience, driving history records, health condition and eyesight information.

(1-4) Sight Line Detection Unit 102

The sight line detection unit 102 obtains the sight line direction information D2 indicating the direction of the line of sight of the driver. The sight line detection unit 102 obtains the sight line direction information D2 indicating the direction in which the driver is viewing. The direction in which the driver is viewing is the direction in which the driver is looking with the eyes. The direction in which the driver is viewing is referred to also as a "sight line direction". The sight line detection unit 102 detects the sight line direction of the driver based on an image of the driver's face or eyes captured by the in-vehicle camera 21. The sight line detection unit 102 is capable of detecting the driver's sight line direction three-dimensionally by use of three-dimensional measurement based on the positions of pupils of both eyes of the driver with respect to the position of the face of the driver in a captured image captured by the in-vehicle camera 21. The sight line detection unit 102 can also be a part of a device worn by the driver. The sight line detection unit 102 can be a device provided as a part of eyeglasses worn by the driver, for example.

(1-5) Environment Information Acquisition Unit 103

The environment information acquisition unit 103 acquires the traveling environment information D3 indicating the environment around the vehicle based on images captured by the vehicle-outside camera 22. The traveling environment information D3 includes information indicating objects existing around the vehicle driven by the driver and the situation around the vehicle. The environment information acquisition unit 103 acquires information regarding the objects existing around the vehicle from the vehicle-outside camera 22 provided on the vehicle. The objects existing around the vehicle are, for example, other vehicles, pedestrians, animals, obstacles, and so forth. The situation around the vehicle includes, for example, information indicating weather acquired based on vehicle position information and time information, information indicating the direction of sunlight, road congestion information acquired based on the vehicle position information and the time information, and so forth. The environment information acquisition unit 103 may acquire information regarding the weather and road environment (e.g., congestion condition) from a server for information provision via a network. Further, the environment information acquisition unit 103 may acquire the position information on the vehicle driven by the driver from a positioning system such as a GPS (Global Positioning System).

(1-6) Visual Recognition Level Calculation Unit 104

Figure 5:
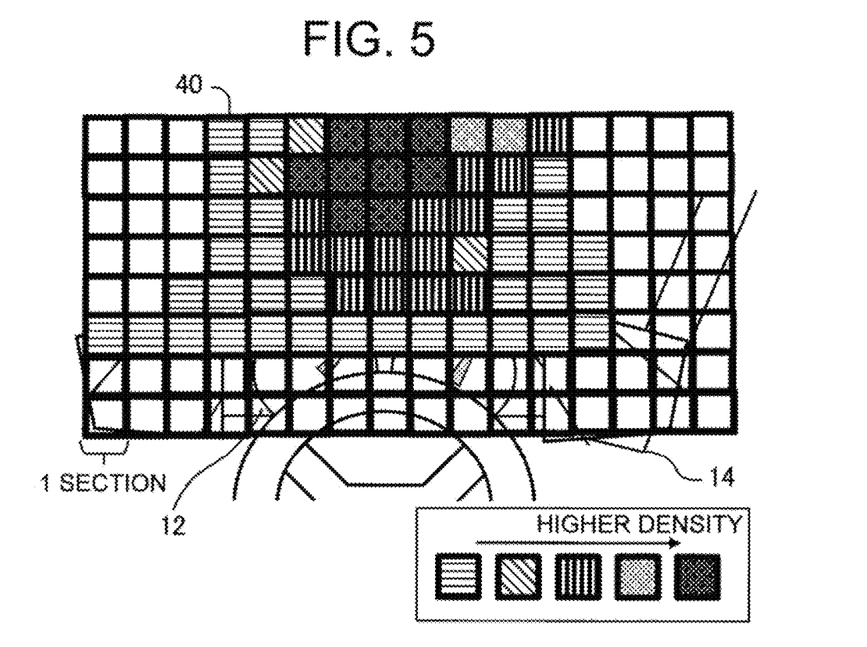
FIG. 5 is a diagram showing an example of a visual recognition level map indicating visual recognition levels used by the display control device according to the first embodiment.

FIG. 5 is a diagram showing an example of a visual recognition level map 40 indicating the visual recognition levels D4 generated by the visual recognition level calculation unit 104 of the display control device 100 according to the first embodiment. The visual recognition level D4 is information quantifying a character representing the ease of visual recognition of each of the sections in the visual field range of the driver. The visual recognition level D4 in each of the plurality of sections in the visual field range can be represented by the visual recognition level map 40. The visual recognition level map 40 is formed of a plurality of rectangular sections arranged in a grid and the visual recognition level in each of the plurality of rectangular sections. The visual recognition level map 40 shown in FIG. 5 indicates the amount of information that can be visually recognized by the driver when the driver views forward in the state of the present sight line direction, by using densities and different fill-in patterns of the plurality of sections. For example, with the increase in the color density of a section in the visual recognition level map 40, the driver can easily acquire visual information, whereas guidance of the line of sight is more likely to occur. Namely, a section in dense color is a region with high perceptual sensitivity and has high ability to guide the line of sight towards the section. With the decrease in the color density of a section in the visual recognition level map 40, the section is less likely to hinder the driver's driving actions, whereas the driver is more likely to overlook the displayed image. Namely, a section in pale color is a region with low perceptual sensitivity and has low ability to guide the driver's line of sight towards the section.

The visual recognition level calculation unit 104 calculates the visual recognition level D4 based on the sight line direction information D2, the driving skill information D1 and the traveling environment information D3. For the calculation of the visual recognition level D4, the visual recognition level calculation unit 104 can employ a method of estimating regions of central vision and peripheral vision used in the field of human visual cognitive engineering. The central vision region is a region close to the line of sight in the visual field range and is a region that is easily perceived by the driver. In other words, the central vision region is a visual region with high perceptual sensitivity. The peripheral vision region is a region far from the line of sight in the visual field range and is a region that is difficult to be perceived by the driver. In other words, the peripheral vision region is a visual region with low perceptual sensitivity even though being visible to the driver. Incidentally, magnitude of the perceptual sensitivity at a boundary between the central vision region and the peripheral vision region and in each of the regions in the visual field range varies depending on physical individual differences, environment around the driver, and so forth.

The visual recognition level calculation unit 104 estimates the visual field range based on the driving skill information D1 and the sight line direction information D2. When the driver has a lot of driving experience, that is, when the driver has high driving proficiency, the driver has a wide visual field and thus the visual field range is wide. The reason why the visual field range is wide is that a driver having high proficiency empirically has thorough knowledge of visual information necessary for performing a driving action and thus never focuses his/her attention too much on the driving operation. In contrast, when the driver has little driving experience, that is, when the driver has low driving proficiency, the driver's visual field is narrow and thus the visual field range is narrow. The reason why the visual field range is narrow is that a driver having low proficiency tends to be strained and focus his/her attention too much on the driving operation and thus the ratio of attention directed towards the vision is low. Further, the visual recognition level is high in a region close to the line of sight and decreases as the position moves from the line of sight towards the edge of the visual field range. For the above-described reasons, the visual recognition level calculation unit 104 is capable of estimating the visual recognition level of the driver in the visual field range centering at the line of sight represented by the sight line direction information D2 on the driver and in each section in the visual field range based on the driving skill of the driver.

Further, the driver's information processing capability in regard to the sight line direction is evaluated by using information quantity integrated in a time axis space. Therefore, when the visual recognition level calculation unit 104 recognizes that the driver is continuously viewing in the same direction other than the direction of a center position of the visual field range, it can be considered that the driver's focusing of attention on the center position of the visual field range has decreased and the visual recognition level at the center position of the visual field range has decreased. Therefore, in the case where it is recognized that the driver is continuously viewing in the same direction other than that of the center position of the visual field range, the visual recognition level calculation unit 104 can correct the visual recognition level in each of the plurality of sections based on the direction in which the driver is continuously viewing for a long time and the sight line direction.

Furthermore, it has been confirmed that the visual field range and the visual recognition level of the driver change depending on the driver's health condition or actions other than the driving actions. Therefore, the visual recognition level calculation unit 104 may correct the visual field range and the visual recognition level obtained based on the driving skill depending on the driver's condition.

Moreover, when the traveling environment indicated by the traveling environment information D3 is an environment with high density of vehicles such as congestion, for example, the visual recognition level is considered to decrease in the whole of the visual field range since there are a lot of events that should be considered in regard to the driving actions, such as adjoining vehicles and a pedestrian rushing out onto the road. Therefore, the visual recognition level calculation unit 104 may correct the estimated visual field range and visual recognition level based on the traveling environment information D3.

In addition, in an environment in which obstruction or focusing of attention in regard to a particular direction is seen, such as an environment in which sunlight comes in from a certain direction or the vehicle goes around a curve, the visual recognition level calculation unit 104 may correct the estimated visual field range and visual recognition level based on the direction of sunlight in the visual field range, the traveling direction of the vehicle, and so forth.

As shown in FIG. 5, the visual recognition level indicated by the visual recognition level map 40 is represented as a numerical value (density in FIG. 5) in each of the plurality of rectangular sections arranged in a grid in the visual field range in front as viewed from the driver. First, the visual recognition level calculation unit 104 obtains a center of the driver's viewpoint position from the sight line direction information D2 and calculates an intersection point of a three-dimensional straight line in the direction of a sight line center and the visual field range in front. The sight line center varies depending on the method of obtaining the sight line direction information D2. For example, when the sight line direction is obtained based on the pupils of both eyes, the direction of the sight line center is the direction of a straight line connecting an intersection point of sight line vectors of both eyes and a midpoint of three-dimensional positions of both eyes. A vector in the direction of the sight line center is a sight line center vector.

Subsequently, the visual recognition level calculation unit 104 calculates the visual recognition level of the rectangular section corresponding to the position of the intersection point of the visual field range in front and the straight line in the direction of the sight line center. The calculation of the visual recognition level of each section is made by a process of subtracting a decrease component of the visual recognition level including the traveling environment or the driver's condition as a variable from a maximum value of the visual recognition level. For example, when road condition around the vehicle as the traveling environment is congested, the number of objects that the driver should view increases, and thus the decrease component of the visual recognition level takes on a large value. For example, in an environment in which the driver's ability to concentrate decreases such as in a case where the driver is in mental condition with impatience, the driver's physical health condition is poor or the driver is conversing with a passenger, the decrease component of the visual recognition level takes on a large value. For example, when the driver's driving skill is low, the driver is less likely to pay attention to the surroundings, and thus the decrease component of the visual recognition level takes on a small value and the visual recognition level in the section in the direction of the sight line center becomes high.

Subsequently, the visual recognition level calculation unit 104 successively calculates the visual recognition levels of the sections around the section at the center position of the visual field range based on the visual recognition level of the section at the center position. The visual recognition level in the visual field range of the human gradually decreases like a pattern of concentric circles as the position separates from the center position. Therefore, the visual recognition levels of the sections around the section at the center position are calculated by regarding the center position as the center of the concentric circles and based on the value of the visual recognition level of the section at the center position by using a calculation formula as a function including a variable representing the radius of a concentric circle. Further, this calculation formula changes depending on the driving environment, the driver's condition and so forth. For example, when the driving environment is congested, the driver often pays attention to the surroundings, and thus the ratio of the decrease in the visual recognition level with the increase in the radius is low. For example, the driver's mental condition or physical condition influences the driver's ability to concentrate, and thus the ratio of the decrease in the visual recognition level varies depending on the driver's condition. For example, when the driver's driving skill is low, the driver is incapable of sufficiently paying attention to the surroundings, and thus the ratio of the decrease in the visual recognition level becomes high in peripheral sections.

Further, the visual recognition level calculation unit 104 may use different values of the visual recognition level for the inside and the outside of a concentric circle at a predetermined radius from the sight line center. In the visual properties of the human, the central vision region is generally regarded as a region within approximately 30 degrees to the left and right with reference to the sight line center, and a visual field range at larger angles is referred to as the peripheral vision region. It is generally said that a great difference occurs between the central vision region and the peripheral vision region in the visual recognition level in cases like discrimination between conditions by a human. Therefore, the visual recognition level calculation unit 104 may separately handle sections situated in the central vision region from the sight line direction in the three-dimensional space and sections situated in the peripheral vision region and perform the calculation of the visual recognition levels in a way adapted to the visual properties of the driver by changing a calculation formula to be subtracted (i.e., calculation formula representing the decrease component of the visual recognition level).

Furthermore, the visual recognition level calculation unit 104 may execute a visual recognition level correction process based on the environment outside the vehicle. For example, when intense light from a particular direction, such as backlight, light from a street lamp at night or light from an illuminator in a tunnel, enters the visual field, the visual recognition level in regions around the intense light drops significantly. The visual recognition level calculation unit 104 can carry out calculation of the visual recognition level that is robust to the traveling environment by making a correction, by subtracting a decrease component of the visual recognition level from the visual recognition level obtained from the calculation formula, based on the traveling environment information D3 including a result of detecting an object outside the vehicle or detecting environment around the vehicle.

(1-7) Display Control Unit 105

The display control unit 105 generates image information D5, for performing display control suitable for the driver, based on the display information D0 and the visual recognition level D4. The display information D0 is visual presentation information regarding the driving actions. The display information D0 includes, for example, a speed indication on the panel display device 12, information indicating vehicle condition, navigation information, alert information at times of driving, and so forth. Further, the display information D0 may include information indicating an importance level of each item of presentation information used in the display control.

The display control unit 105 provides display signals to the HUD device 11, the panel display device 12, the side mirror display devices 13 and 14 and the rearview mirror display device 15 as the various types of display devices. The display control unit 105 performs display control suitable for the driver based on the display information D0 and the visual recognition level D4. The display control is implemented by executing a control process of controlling the display content and the display method based on the visual recognition levels D4 at the display positions of the HUD device 11, the panel display device 12, the side mirror display devices 13 and 14 and the rearview mirror display device 15. For example, the display control unit 105 arranges images of a plurality of items of display information D0 at positions at high visual recognition levels according to the importance levels of the plurality of items of display information D0. Further, the display control unit 105 may change the display position, the display color, the display time and the display content of each of the plurality of items of display information D0 depending on the importance level, for example.

The display control unit 105 may arrange the images so as to make it possible to intuitively notify the driver of information regarding a direction included in the display information D0, a relevance between the display information D0 and another item of information, or the like. For example, when an object to which the driver should pay attention exists in a certain direction, the display control unit 105 may arrange an image based on the display information D0 in the same direction as that of the object. Further, the display control unit 105 may carry out the display so that the display information D0 and another item of information related to the display information D0 are connected to each other in an image. In this case, the display control unit 105 is capable of making the driver appropriately perceive an image displayed at a position at a low visual recognition level.

Further, if an image based on the display information D0 is arranged at a position at a high visual recognition level, there is a possibility that visual attention in the driving action is obstructed. Therefore, the display control unit 105 may set an upper limit to the area of a display region that can be displayed in a region whose visual recognition level D4 is higher than or equal to a predetermined threshold value. In this case, the visual attention in the driving action becomes less likely to be obstructed by an image displayed at a position at a high visual recognition level.

Furthermore, the display control unit 105 can prompt the driver to intuitively recognize the displayed information by changing the color of the displayed image depending on the importance level of the display information D0. When an image is displayed by the HUD device 11, the display control unit 105 can make the image be more perceptible by using a color greatly different from the color of the scene outside the vehicle depending on the environment outside the vehicle. Further, since the color of the outside world viewed by the driver changes depending on insolation environment and road environment outside the vehicle, the display control unit 105 can display an image easily perceptible to the driver by displaying the image in a color greatly different from the color of the outside world viewed by the driver.

When displaying an image based on display information D0 at a high importance level for a long time, the display control unit 105 can display the image at a position at a low visual recognition level even though the display information D0 is at the high importance level. When displaying an image based on display information D0 requiring urgency, the display control unit 105 can enhance the alerting effect by displaying the image at a position at a high visual recognition level just for a time period enabling the recognition of the image. The display control unit 105 can obtain the shortest display time capable of achieving a sufficiently strong alerting effect by calculating how the amount of accumulation of visually perceived information varies depending on the display time and the sight line direction.

Further, by using a figure such as an arrow, an illustration or an icon as the display content, the display control unit 105 can shorten the time the driver takes to recognize the displayed information compared to cases of displaying text. Furthermore, the display control unit 105 determines a necessity level of the display information D0 indicating to what extent the information is necessary for the driver, according to the contents of the display information D0, arranges an image of a figure that the driver can understand at a glance, such as an illustration or an icon, at a position at a low visual recognition level if the necessity level is low, and arranges an image of a sentence or the like at a position at a high visual recognition level if the necessity level is high.

Figure 6:
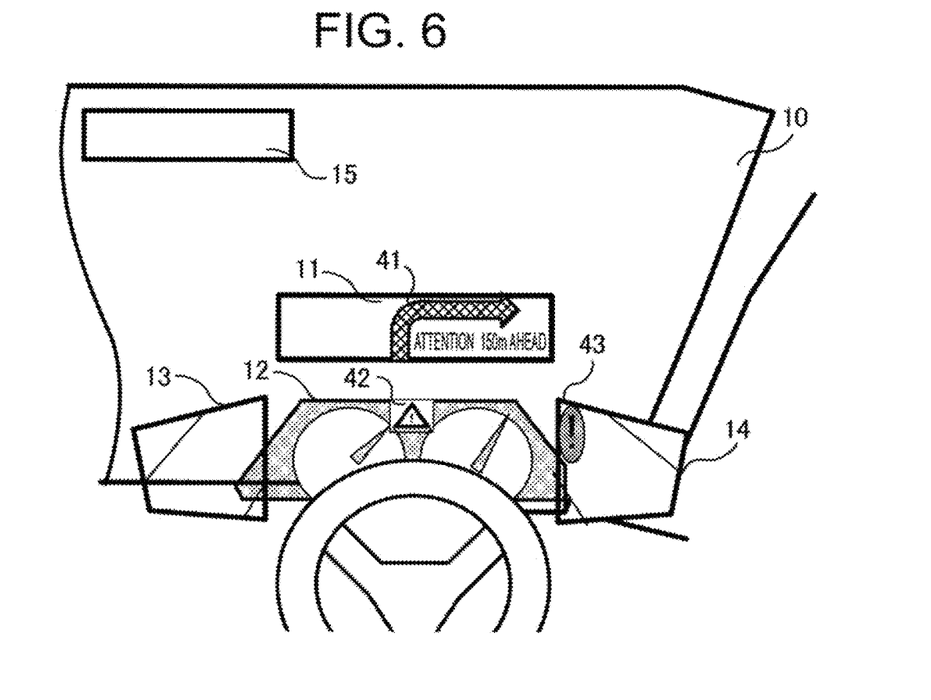
FIG. 6 is a diagram showing an example of an image displayed based on control executed by the display control device according to the first embodiment.

FIG. 6 is a diagram showing an example of an image displayed based on control executed by the display control device 100 according to the first embodiment. FIG. 6 shows an example of the contents of display control assuming a driver whose driving skill is low. In general, the visual field range is narrow in cases of a driver whose driving skill is low. FIG. 6 shows a case where the sight line center is at the center of a driving direction as the vehicle's traveling direction and a part of the HUD device 11 or the panel display device 12 can be perceived as the peripheral vision. Thus, when the display information D0 is at a high importance level like information regarding an object to which the driver needs to pay attention, the display control unit 105 increases the visual recognition level by arranging the image at a position on the HUD device 11 and close to the sight line direction.

Further, the display control unit 105 produces a display that is intuitively recognizable by increasing the ratio of figure display of an icon or the like relative to text display. Furthermore, for information at a low importance level in the display information D0, the display control unit 105 executes display control that does not hinder the driving action, such as position control of arranging the image in the peripheral vision region or control of setting a display time proportional to the importance level and changing the display content depending on the time.

Figure 7:
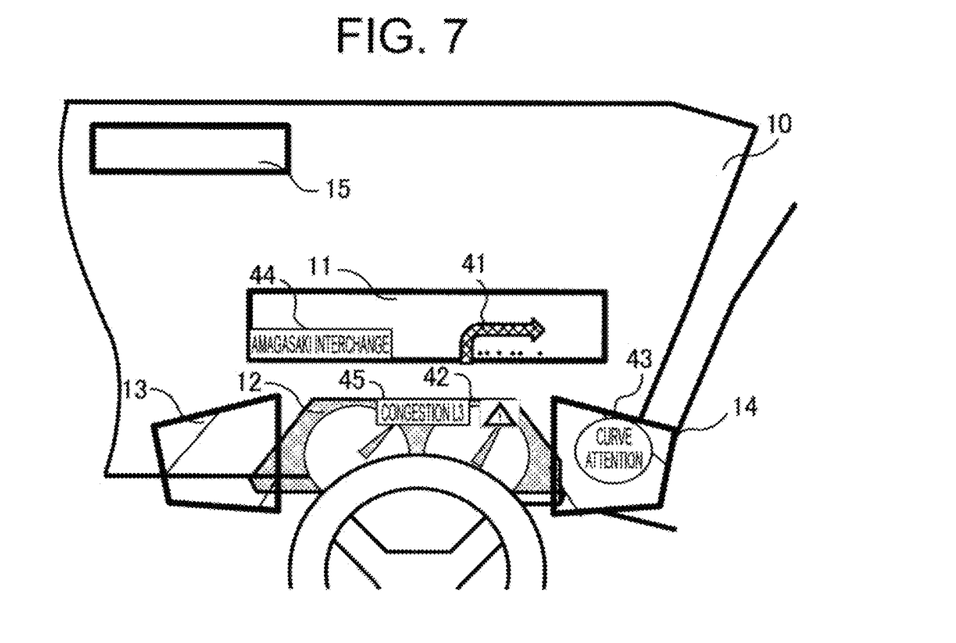
FIG. 7 is a diagram showing an example of an image displayed based on control executed by the display control device according to the first embodiment.

FIG. 7 is a diagram showing an example of an image displayed based on control executed by the display control device 100 according to the first embodiment. FIG. 7 shows the contents of display control on the assumption that the driver's driving skill is high. In general, the visual field range is wide in cases of a driver whose driving skill is high. FIG. 7 shows a case where the sight line center is at the center of the driving direction, upper halves of the HUD device 11 and the panel display device 12 can be perceived as the central vision, and parts of the side mirror display devices 13 and 14 can be perceived as the peripheral vision. Since the central visual field is wide based on the visual recognition levels, the display control unit 105 carries out a display that is unlikely to cause sight line guidance by arranging a navigation icon 41 and destination display information 44 in an edge part of a display surface of the HUD device 11, that is, in a region at a low visual recognition level. Further, the display control unit 105 arranges congestion level display information 45 in an upper part of the panel display device 12, or arranges an alert display icon 43 in an edge part of the side mirror display device 14, or the like, which enables the driver to perceive visual information at a low importance level in the wide peripheral visual field without undergoing the sight line guidance.

(1-8) Effect

As described above, with the display control device 100, the display control method or the display control program according to the first embodiment, the display position and the display method of the image presented to the driver can be determined according to the driver's driving skill, the driver's sight line direction and the environment around the vehicle, and thus the display control can be executed so that the image is displayed at a position and by a method appropriate for each driver. For example, a driver whose driving skill is high can recognize the image information precisely and without having the visual field obstructed by the displayed image. A driver whose driving skill is low can focus his/her attention on the driving without overlooking the displayed image and without being forced to widely move the line of sight.

(2) Second Embodiment

A display control device according a second embodiment has a configuration similar to that of the display control device 100 according to the first embodiment shown in FIG. 3. Further, a display control method executed by the display control device according the second embodiment is a process similar to the display control method according to the first embodiment shown in FIG. 4. Therefore, FIG. 1 to FIG. 4 are referred to in the description of the second embodiment. In the second embodiment, a description will be given of a display control method at the time of the driving action by use of the side mirror display devices 13 and 14 and the rearview mirror display device 15 that display images of the outside of the vehicle.

Figure 8:
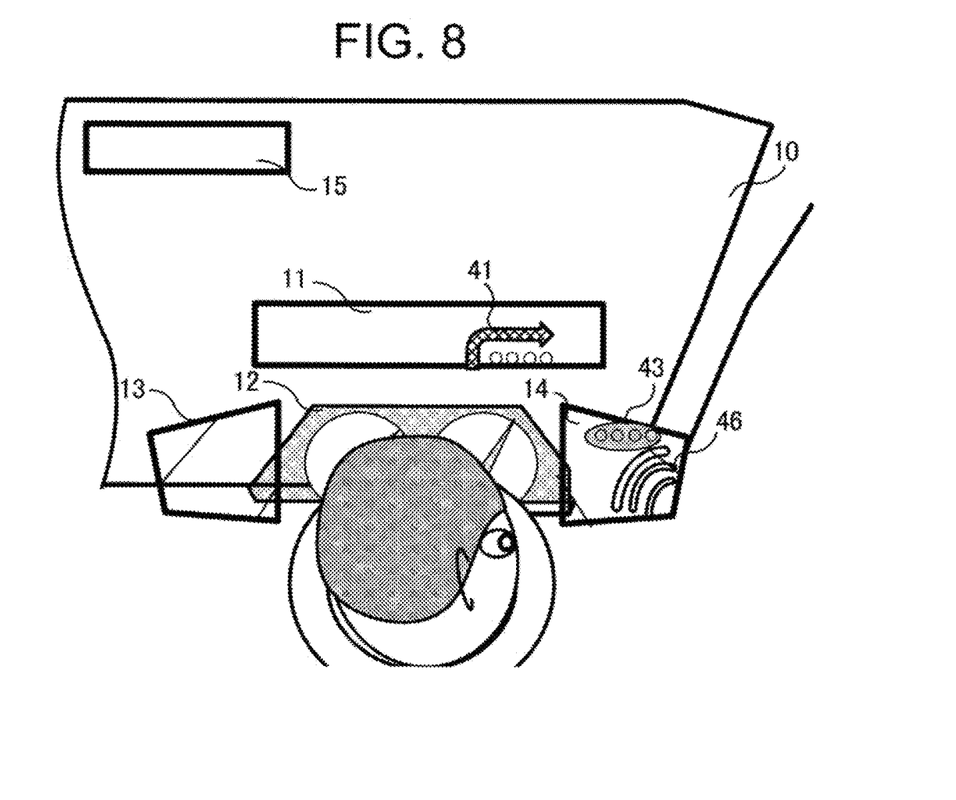
FIG. 8 is a diagram showing an example of an image displayed based on control executed by a display control device according to a second embodiment of the present invention.
Figure 9:
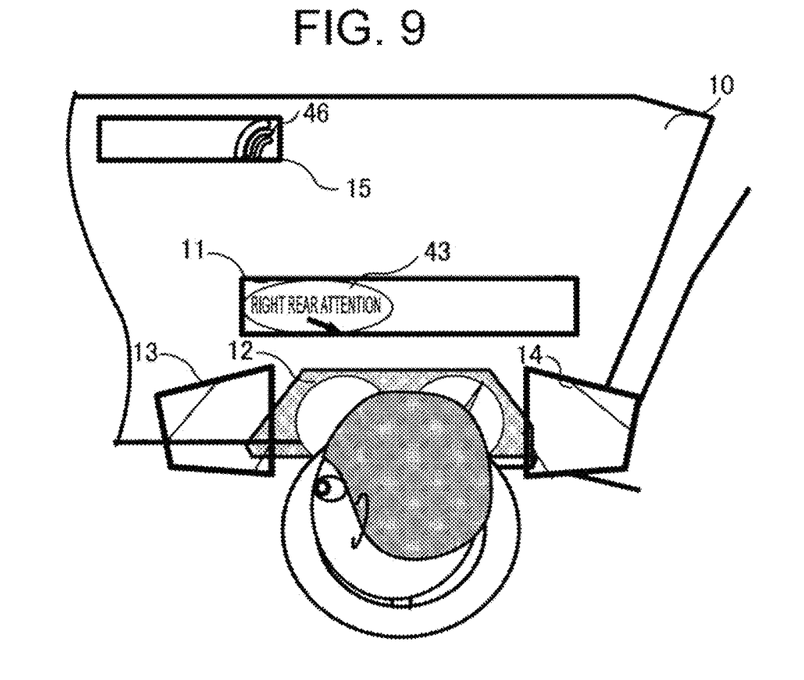
FIG. 9 is a diagram showing an example of an image displayed based on control executed by the display control device according to the second embodiment.

FIG. 8 is a diagram showing an example of an image displayed based on control executed by the display control device according to the second embodiment. FIG. 8 shows an example of display control of the side mirror display device 14 and the HUD device 11. FIG. 9 is a diagram showing an example of an image displayed based on control executed by the display control device according to the second embodiment. FIG. 9 shows an example of display control of the rearview mirror display device 15 and the HUD device 11. In general, the visual field range at the time of a right turn driving action changes depending on the driving situation from a front right direction to the direction of the side window. At the time of a reverse driving action, regions around the left and right side mirror display devices 13 and 14 and the rearview mirror display device 15 can be included in the visual field range. Further, these visual field ranges vary depending on the driver's driving skill, the driver's habit, or both of these factors.

In the second embodiment, the visual recognition level calculation unit 104 calculates the visual recognition level D4 in the right turn driving action by preestimating movement of the visual field range with time at the time of the right turn driving action based on the driving skill information D1 as the result of the estimation by the skill estimation unit 101 or the sight line direction information D2 as the result of the detection by the sight line detection unit 102. Here, for the preestimation of the movement of the visual field range with time, the visual recognition level calculation unit 104 accumulates information indicating movement of the sight line direction and the driving action in similar driving actions, and calculates the visual field range and the visual recognition level D4 by averaging the accumulated information. Further, since the sight line direction and the driving action change depending on the environment outside the vehicle, the visual recognition level calculation unit 104 is desired to average a certain number of pieces of information greater than or equal to a predetermined number of times. Furthermore, in order to exclude influence of information transition caused by slight movements, the visual recognition level calculation unit 104 may perform a filtering process on the information indicating the sight line direction and the information indicating the driving action changing depending on the environment outside the vehicle.

By the above-described method, even when the driver's viewpoint position changes in the right turn driving action, the display control unit 105 can arrange information at a high importance level in the visible visual field and arrange information at a low importance level so that the information is visible only at a certain viewpoint position in the right turn driving action.

FIG. 8 shows an example of the display control in the right turn driving action. The navigation icon 41 can be displayed so that the icon can be perceived in the central vision region only at the viewpoint position at the start of the right turn driving action and thereafter the icon never obstructs the visual field in the right turn driving action. Further, by performing arrangement control so that the alert display icons 43 and 46 at high information importance levels are in the visual field range at any time and position in the right turn driving action, the time when the driver recognizes an object that needs to be paid attention to can be made earlier.

FIG. 9 shows an example of display control when the driver is viewing the rearview mirror display device 15 at the time of the reverse driving action. The alert display icons 43 and 46 are display information for making the driver recognize an object that needs to be paid attention to when the object has appeared in a right rear direction. In this example, when the driver is viewing the rearview mirror display device 15, an icon not obstructing other display information is arranged on the rearview mirror display device 15. In this case, by performing the icon display so that the driver can view the icon in a display region of the HUD device 11 situated in the peripheral visual field when the driver has changed the viewpoint position to the rightward direction, the driver is relieved of the need to move his/her body or line of sight for the purpose of viewing the icon at the time of the reverse driving action.

(3) Third Embodiment

A display control device according a third embodiment has a configuration similar to that of the display control device 100 according to the first embodiment shown in FIG. 3. Further, a display control method executed by the display control device according the third embodiment is a process similar to the display control method of the display control device 100 according to the first embodiment shown in FIG. 4. Therefore, FIG. 1 to FIG. 4 are referred to in the description of the third embodiment. In the third embodiment, a description will be given of a display control method used when sight line movement necessary for a driving action has not been performed appropriately.

Figure 10:
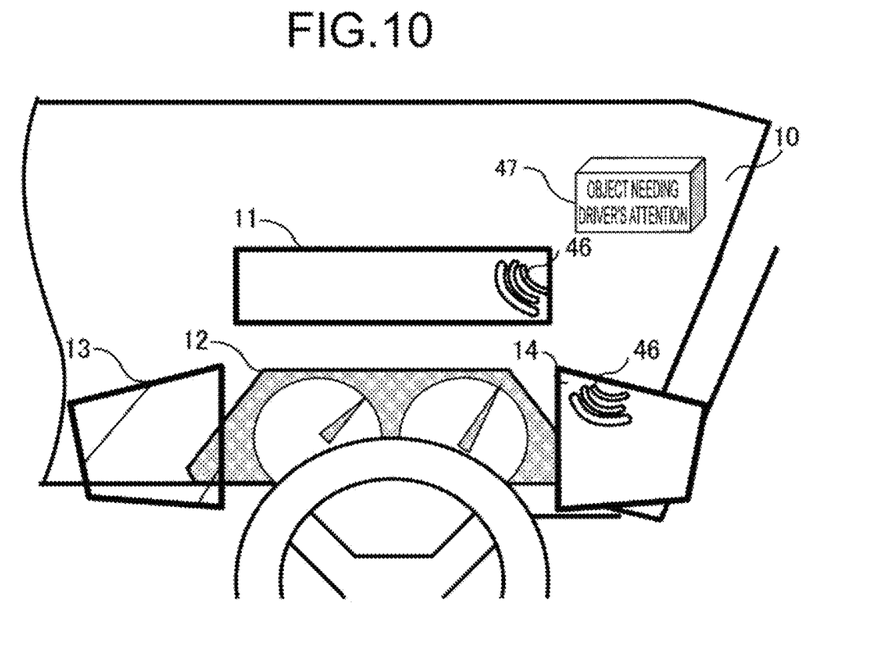
FIG. 10 is a diagram showing an example of an image displayed based on control executed by a display control device according to a third embodiment of the present invention.

FIG. 10 is a diagram showing an example of an image displayed based on control executed by the display control device according to the third embodiment. FIG. 10 shows an example of a display for guiding the driver's line of sight to a direction of a position where an object 47 that needs to be paid attention to exists outside the range of the visual recognition level map 40 when the visual recognition levels D4 of the driver have been determined as in the visual recognition level map 40 in FIG. 5.

In the third embodiment, when the viewpoint position needs to be pointed outside the range of the visual recognition level map 40, the display control unit 105 displays the alert display icon 46 at a position in the visual field range and close to the direction of the guidance. With this method, the sight line guidance display can be carried out without obstructing the driving action that the driver has in mind and the perception by the central visual field.

(4) Modification

Further, the configurations of the display control devices in the first to third embodiments described above can be appropriately combined with each other.

DESCRIPTION OF REFERENCE CHARACTERS

1: driving support device, 10: front windshield, 11: HUD device, 12: panel display device, 13: side mirror display device, 14: side mirror display device, 15: rearview mirror display device, 21: in-vehicle camera, 22: vehicle-outside camera, 31: processor, 32: memory, 40: visual recognition level map, 41: navigation icon, 42: alert display icon, 43: alert display icon, 44: destination display information, 45: congestion level display information, 46: alert display icon, 100: display control device, 101: skill estimation unit, 102: sight line detection unit, 103: environment information acquisition unit, 104: visual recognition level calculation unit, 105: display control unit, D0: display information, D1: driving skill information, D2: sight line direction information, D3: traveling environment information, D4: visual recognition level, D5: image information.

What is claimed is:
1. A display control device comprising:
processing circuitry
to acquire traveling environment information indicating environment around a vehicle driven by a driver;
to estimate driving skill of the driver and to generate driving skill information indicating the driving skill;
to detect a direction of a line of sight of the driver and to generate sight line direction information indicating the direction of the line of sight;
to accumulate information on movements of the sight line direction occurring at times of driving actions of the driver and driving action information on the driver in a memory, the information on the movements being obtained by the sight line direction information;

to calculate a visual field range indicating a region that can be visually recognized by the driver and a visual recognition level indicating ease of recognition of each of a plurality of sections in the visual field range by the driver's vision based on the information on the movements of the sight line direction and the driving action information accumulated in the memory and at least one of the traveling environment information and the driving skill information; and to receive display information to be presented to the driver and to control at least one of a display position and a display method of an image on a basis of the display information based on the display information, the visual field range and the visual recognition level.

2. The display control device according to claim 1, wherein the processing circuitry calculates the visual recognition level based on the sight line direction information on the driver, the driving skill information and the traveling environment information.

3. The display control device according to claim 1, wherein the processing circuitry edits the position and the display method of displaying the image on the basis of the display information depending on the acquired visual recognition level and an importance level of the display information.

4. The display control device according to claim 1, wherein the processing circuitry executes control for producing a display that guides the driver's line of sight from the driver's visual field range to a sight line direction in which the driver should view according to the driver's visual field range and the acquired visual recognition level and information indicating the sight line direction in which the driver should view included in the display information.

5. The display control device according to claim 1, wherein the processing circuitry acquires position information regarding the vehicle, weather around the vehicle and road environment information.

6. The display control device according to claim 1, wherein the processing circuitry detects an object existing around the vehicle based on information acquired from a camera that captures an image of a scene outside the vehicle or an infrared ray sensor.

7. The display control device according to claim 1, wherein the processing circuitry acquires and accumulates driving actions of the driver and estimates the driving skill from a frequency of a predetermined driving action.

8. The display control device according to claim 7, wherein the processing circuitry acquires biological information on the driver and corrects the driving skill information based on the biological information.

9. The display control device according to claim 7, wherein the processing circuitry acquires the driver's driving experience, driving history records, health condition or eyesight information and corrects the driving skill information based on one or more items of information among the driving experience, the driving history records, the health condition and the eyesight information.

10. A display control method comprising:
acquiring traveling environment information indicating environment around a vehicle driven by a driver;
estimating driving skill of the driver and generating driving skill information indicating the driving skill;
detecting a direction of a line of sight of the driver and generating sight line direction information indicating the direction of the line of sight;
accumulating information on movements of the sight line direction occurring at times of driving actions of the driver and driving action information on the driver in a memory, the information on the movements being obtained by the sight line direction information;
calculating a visual field range indicating a region that can be visually recognized by the driver and a visual recognition level indicating ease of recognition of each of a plurality of sections in the visual field range by the driver's vision based on the accumulated information on the movements of the sight line direction and the accumulated driving action information and at least one of the traveling environment information and the driving skill information; and
receiving display information to be presented to the driver and controlling at least one of a display position and a display method of an image on a basis of the display information based on the display information, the visual field range and the visual recognition level.

11. A non-transitory computer-readable storage medium storing a display control program that causes a computer to execute:
acquiring traveling environment information indicating environment around a vehicle driven by a driver;
estimating driving skill of the driver and generating driving skill information indicating the driving skill;
detecting a direction of a line of sight of the driver and generating sight line direction information indicating the direction of the line of sight;
accumulating information on movements of the sight line direction occurring at times of driving actions of the driver and driving action information on the driver in a memory, the information on the movements being obtained by the sight line direction information;
calculating a visual field range indicating a region that can be visually recognized by the driver and a visual recognition level indicating ease of recognition of each of a plurality of sections in the visual field range by the driver's vision based on the accumulated information on the movements of the sight line direction and the accumulated driving action information and at least one of the traveling environment information and the driving skill information; and
receiving display information to be presented to the driver and controlling at least one of a display position and a display method of an image on a basis of the display information based on the display information, the visual field range and the visual recognition level.

* * * * *